(12) United States Patent  
Martin et al.

(10) Patent No.: US 9,271,437 B2  
(45) Date of Patent: Mar. 1, 2016

(54) AGRICULTURAL FIELD PREPARATION DEVICE

(76) Inventors: Charles H. Martin, Loysville, PA (US); Dominic R. Martin, Loysville, PA (US)

(*) Notice: Subject to any disclaimer, the term of this patent is extended or adjusted under 35 U.S.C. 154(b) by 653 days.

(21) Appl. No.: 13/526,714

(22) Filed: Jun. 19, 2012

(65) Prior Publication Data

US 2013/0000535 A1  Jan. 3, 2013

Related U.S. Application Data

(60) Provisional application No. 61/503,802, filed on Jul. 1, 2011.

(51) Int. Cl.
| | | |
|---|---|---|
| *A01B 5/00* | (2006.01) | |
| *A01B 39/12* | (2006.01) | |
| *A01C 7/00* | (2006.01) | |
| *A01C 7/06* | (2006.01) | |
| *A01B 61/04* | (2006.01) | |

(52) U.S. Cl.
CPC .............. *A01B 39/12* (2013.01); *A01B 61/04* (2013.01); *A01C 7/006* (2013.01); *A01C 7/06* (2013.01)

(58) Field of Classification Search
CPC ...... A01B 63/10; A01B 63/114; A01B 49/04; A01B 49/027; A01B 29/04; A01B 29/045; A01B 29/048; A01B 35/16; A01B 27/00; A01C 5/066; A01C 5/068; A01C 7/006
USPC ................................... 111/59, 62; 172/4, 69
See application file for complete search history.

(56) References Cited

U.S. PATENT DOCUMENTS

| 114,002 A | 4/1871 | Godfrey |
|---|---|---|
| 353,491 A | 2/1886 | Wells |
| 523,508 A | 7/1894 | Bauer et al. |
| 736,369 A | 8/1903 | Dynes et al. |
| 803,088 A | 10/1905 | Barker |
| 1,134,462 A | 4/1915 | Kendrick |
| 1,158,023 A | 10/1915 | Beaver |
| 1,247,744 A | 11/1917 | Trimble |
| 1,260,752 A | 3/1918 | Casaday |
| 1,321,040 A | 11/1919 | Hoffman |
| 1,391,593 A | 9/1921 | Sweeting |
| 1,398,668 A | 11/1921 | Bordsen |
| 1,791,462 A | 2/1931 | Bermel |

(Continued)

FOREIGN PATENT DOCUMENTS

| BE | 551372 | 10/1956 |
|---|---|---|
| CA | 530673 | 9/1956 |

(Continued)

OTHER PUBLICATIONS

Case Corporation Brochure, Planters 900 Series Units/Modules Product Information, Aug. 1986 (4 pages).

(Continued)

*Primary Examiner* — Alicia Torres
(74) *Attorney, Agent, or Firm* — Nixon Peabody LLP

(57) ABSTRACT

An agricultural device associated with reduced tillage techniques in a field includes a frame and a separator supported by the frame. The separator is configured to form a strip of exposed soil in residual plant matter in the field. A crimping device associated with the separator is configured to at least partially crush stems of residual plant matter while maintaining the strip.

20 Claims, 11 Drawing Sheets

(56) References Cited

U.S. PATENT DOCUMENTS

| | | | |
|---|---|---|---|
| 1,901,299 A | 3/1933 | Johnson | |
| 1,901,778 A | 3/1933 | Schlag | |
| 2,014,334 A | 9/1935 | Johnson | |
| 2,058,539 A | 10/1936 | Welty et al. | |
| 2,269,051 A | 1/1942 | Cahoy | |
| 2,341,143 A | 2/1944 | Herr | |
| 2,505,276 A | 4/1950 | Boroski | |
| 2,561,763 A | 7/1951 | Waters et al. | |
| 2,593,176 A | 4/1952 | Patterson | |
| 2,611,306 A | 9/1952 | Strehlow et al. | |
| 2,612,827 A | 10/1952 | Baggette et al. | |
| 2,691,353 A | 10/1954 | Secondo | |
| 2,692,544 A | 10/1954 | Jessup | |
| 2,715,286 A | 8/1955 | Saveson | |
| 2,754,622 A | 7/1956 | Rohnert | |
| 2,771,044 A | 11/1956 | Putifer | |
| 2,773,343 A | 12/1956 | Oppel | |
| 2,777,373 A | 1/1957 | Pursche | |
| 2,799,234 A | 7/1957 | Chancey | |
| 2,805,574 A | 9/1957 | Jackson, Jr. et al. | |
| 2,925,872 A | 2/1960 | Darnell | |
| 2,960,358 A | 11/1960 | Christison | |
| 3,010,744 A | 11/1961 | Hollis | |
| 3,014,547 A | 12/1961 | Van der Lely | |
| 3,038,424 A | 6/1962 | Johnson | |
| 3,042,121 A | 7/1962 | Broetzman et al. | |
| 3,057,092 A | 10/1962 | Curlett | |
| 3,058,243 A | 10/1962 | McGee | |
| 3,065,879 A | 11/1962 | Jennings et al. | |
| 3,110,973 A | 11/1963 | Reynolds | |
| 3,122,901 A | 3/1964 | Thompson | |
| 3,123,152 A | 3/1964 | Biskis | |
| 3,188,989 A | 6/1965 | Johnston | |
| 3,213,514 A | 10/1965 | Evans | |
| 3,250,109 A | 5/1966 | Spyridakis | |
| 3,314,278 A | 4/1967 | Bergman | |
| 3,319,589 A | 5/1967 | Moran | |
| 3,351,139 A | 11/1967 | Schmitz et al. | |
| 3,355,930 A | 12/1967 | Fedorov | |
| 3,370,450 A | 2/1968 | Scheucher | |
| 3,420,273 A | 1/1969 | Greer | |
| 3,447,495 A | 6/1969 | Miller et al. | |
| 3,539,020 A | 11/1970 | Andersson et al. | 74/527 |
| 3,543,603 A | 12/1970 | Gley | 74/529 |
| 3,561,541 A | 2/1971 | Woelfel | 172/265 |
| 3,576,098 A | 4/1971 | Brewer | 56/295 |
| 3,581,685 A | 6/1971 | Taylor | 111/7 |
| 3,593,720 A | 7/1971 | Botterill et al. | 130/27 |
| 3,606,745 A | 9/1971 | Girodat | 56/20 |
| 3,635,495 A | 1/1972 | Orendorff | 280/415 |
| 3,653,446 A | 4/1972 | Kalmon | 172/4 |
| 3,701,327 A | 10/1972 | Krumholz | 111/81 |
| 3,708,019 A | 1/1973 | Ryan | 172/470 |
| 3,718,191 A | 2/1973 | Williams | 172/196 |
| 3,749,035 A | 7/1973 | Cayton et al. | 111/85 |
| 3,753,341 A | 8/1973 | Berg, Jr. et al. | 56/400.04 |
| 3,766,988 A | 10/1973 | Whitesides | 172/548 |
| 3,774,446 A | 11/1973 | Diehl | 73/194 |
| 3,939,846 A | 2/1976 | Drozhzhin et al. | 130/27 |
| 3,945,532 A | 3/1976 | Marks | 222/55 |
| 3,975,890 A | 8/1976 | Rodger | 56/208 |
| 4,009,668 A | 3/1977 | Brass et al. | 111/85 |
| 4,018,101 A | 4/1977 | Mihalic | 74/493 |
| 4,044,697 A | 8/1977 | Swanson | 111/66 |
| 4,055,126 A | 10/1977 | Brown et al. | 111/85 |
| 4,058,171 A | 11/1977 | van der Lely | 172/713 |
| 4,063,597 A | 12/1977 | Day | 172/126 |
| 4,096,730 A | 6/1978 | Martin | 72/352 |
| 4,099,576 A | 7/1978 | Jilani | 172/555 |
| 4,122,715 A | 10/1978 | Yokoyama et al. | 73/228 |
| 4,129,082 A | 12/1978 | Betulius | 111/7 |
| 4,141,200 A | 2/1979 | Johnson | 56/10.2 |
| 4,141,302 A | 2/1979 | Morrison, Jr. et al. | 111/52 |
| 4,141,676 A | 2/1979 | Jannen et al. | 417/539 |
| 4,142,589 A | 3/1979 | Schlagenhauf | 172/510 |
| 4,147,305 A | 4/1979 | Hunt | 239/167 |
| 4,149,475 A | 4/1979 | Bailey et al. | 111/66 |
| 4,157,661 A | 6/1979 | Schindel | 73/228 |
| 4,173,259 A | 11/1979 | Heckenkamp | 172/10 |
| 4,182,099 A | 1/1980 | Davis et al. | 56/16.4 |
| 4,187,916 A | 2/1980 | Harden et al. | 172/146 |
| 4,191,262 A | 3/1980 | Sylvester | 172/459 |
| 4,196,567 A | 4/1980 | Davis et al. | 56/13.7 |
| 4,196,917 A | 4/1980 | Oakes et al. | 280/463 |
| 4,206,817 A | 6/1980 | Bowerman | 172/559 |
| 4,208,974 A | 6/1980 | Dreyer et al. | 111/85 |
| 4,213,408 A * | 7/1980 | West et al. | 111/194 |
| 4,225,191 A | 9/1980 | Knoski | 301/9 |
| 4,233,803 A | 11/1980 | Davis et al. | 56/14.9 |
| 4,241,674 A | 12/1980 | Mellinger | 111/52 |
| 4,280,419 A | 7/1981 | Fischer | 111/80 |
| 4,295,532 A | 10/1981 | Williams et al. | 172/184 |
| 4,301,870 A | 11/1981 | Carre et al. | 172/7 |
| 4,307,674 A | 12/1981 | Jennings et al. | 111/85 |
| 4,311,104 A | 1/1982 | Steilen et al. | 111/85 |
| 4,317,355 A | 3/1982 | Hatsuno et al. | 72/342 |
| 4,359,101 A | 11/1982 | Gagnon | 172/38 |
| 4,375,837 A | 3/1983 | van der Lely et al. | 172/68 |
| 4,377,979 A | 3/1983 | Peterson et al. | 111/52 |
| 4,407,371 A | 10/1983 | Hohl | 172/253 |
| 4,430,952 A | 2/1984 | Murray | 111/85 |
| 4,433,568 A | 2/1984 | Kondo | 72/356 |
| 4,438,710 A | 3/1984 | Paladino | 111/3 |
| 4,445,445 A | 5/1984 | Sterrett | 111/7 |
| 4,461,355 A | 7/1984 | Peterson et al. | 172/156 |
| 4,481,830 A | 11/1984 | Smith et al. | 73/861.71 |
| 4,499,775 A | 2/1985 | Lasoen | 73/862.57 |
| 4,506,610 A | 3/1985 | Neal | 111/87 |
| 4,508,178 A | 4/1985 | Cowell et al. | 172/239 |
| 4,528,920 A | 7/1985 | Neumeyer | 111/85 |
| 4,530,405 A | 7/1985 | White | 172/126 |
| 4,537,262 A | 8/1985 | van der Lely | 172/146 |
| 4,538,688 A | 9/1985 | Szucs et al. | 172/555 |
| 4,550,122 A | 10/1985 | David et al. | 172/158 |
| 4,553,607 A | 11/1985 | Behn et al. | 172/156 |
| 4,580,506 A | 4/1986 | Fleischer et al. | 111/7 |
| 4,596,200 A | 6/1986 | Gafford et al. | 111/85 |
| 4,598,654 A * | 7/1986 | Robertson et al. | 111/165 |
| 4,603,746 A | 8/1986 | Swales | 172/559 |
| 4,604,906 A | 8/1986 | Scarpa | 73/861.74 |
| 4,630,773 A | 12/1986 | Ortlip | 239/1 |
| 4,643,043 A | 2/1987 | Furuta et al. | 74/503 |
| 4,646,620 A | 3/1987 | Buchl | 91/1 |
| 4,650,005 A | 3/1987 | Tebben | 172/430 |
| 4,669,550 A | 6/1987 | Sittre | 172/559 |
| 4,671,193 A | 6/1987 | States | 111/73 |
| 4,674,578 A | 6/1987 | Bexten et al. | 172/126 |
| 4,703,809 A | 11/1987 | Van den Ende | 172/147 |
| 4,726,304 A | 2/1988 | Dreyer et al. | 111/73 |
| 4,738,461 A | 4/1988 | Stephenson et al. | 280/400 |
| 4,744,316 A | 5/1988 | Lienemann et al. | 111/69 |
| 4,762,075 A | 8/1988 | Halford | 111/73 |
| 4,765,190 A | 8/1988 | Strubbe | 73/861.72 |
| 4,768,387 A | 9/1988 | Kemp et al. | 73/861.73 |
| 4,779,684 A | 10/1988 | Schultz | 171/62 |
| 4,785,890 A | 11/1988 | Martin | 172/29 |
| 4,825,957 A | 5/1989 | White et al. | 172/126 |
| 4,825,959 A | 5/1989 | Wilhelm | 172/720 |
| 4,920,901 A | 5/1990 | Pounds | 111/164 |
| 4,926,767 A | 5/1990 | Thomas | 111/187 |
| 4,930,431 A | 6/1990 | Alexander | 111/164 |
| 4,986,367 A | 1/1991 | Kinzenbaw | 172/126 |
| 4,998,488 A | 3/1991 | Hansson | 111/187 |
| 5,015,997 A | 5/1991 | Strubbe | 340/684 |
| 5,027,525 A | 7/1991 | Haukaas | 33/624 |
| 5,033,397 A | 7/1991 | Colburn, Jr. | 111/118 |
| 5,065,632 A | 11/1991 | Reuter | 73/861.73 |
| 5,074,227 A | 12/1991 | Schwitters | 111/137 |
| 5,076,180 A | 12/1991 | Schneider | 111/139 |
| 5,092,255 A | 3/1992 | Long et al. | 111/167 |
| 5,113,957 A | 5/1992 | Tamai et al. | 172/10 |
| 5,129,282 A | 7/1992 | Bassett et al. | 74/529 |
| 5,136,934 A | 8/1992 | Darby, Jr. | 100/125 |
| 5,190,112 A | 3/1993 | Johnston et al. | 172/245 |

(56) References Cited

U.S. PATENT DOCUMENTS

| | | | |
|---|---|---|---|
| 5,234,060 A | 8/1993 | Carter | 172/413 |
| 5,240,080 A | 8/1993 | Bassett et al. | 172/740 |
| 5,255,617 A | 10/1993 | Williams et al. | 111/140 |
| 5,269,237 A | 12/1993 | Baker et al. | 111/121 |
| 5,282,389 A | 2/1994 | Faivre et al. | 73/861.73 |
| 5,285,854 A | 2/1994 | Thacker et al. | 172/176 |
| 5,333,694 A | 8/1994 | Roggenbuck et al. | 172/156 |
| 5,337,832 A | 8/1994 | Bassett | 172/504 |
| 5,341,754 A | 8/1994 | Winterton | 111/139 |
| 5,346,019 A | 9/1994 | Kinzenbaw et al. | 172/311 |
| 5,346,020 A | 9/1994 | Bassett | 172/540 |
| 5,349,911 A | 9/1994 | Holst et al. | 111/139 |
| 5,351,635 A | 10/1994 | Hulicsko | 111/135 |
| 5,379,847 A | 1/1995 | Snyder | 172/128 |
| 5,394,946 A | 3/1995 | Clifton et al. | 172/139 |
| 5,398,771 A | 3/1995 | Hornung et al. | 172/311 |
| 5,419,402 A | 5/1995 | Heintzman | 172/551 |
| 5,427,192 A | 6/1995 | Stephenson et al. | 180/53.1 |
| 5,443,023 A | 8/1995 | Carroll | 111/191 |
| 5,443,125 A | 8/1995 | Clark et al. | 172/608 |
| 5,461,995 A | 10/1995 | Winterton | 111/139 |
| 5,462,124 A | 10/1995 | Rawson | 172/569 |
| 5,473,999 A | 12/1995 | Rawson et al. | 111/127 |
| 5,474,135 A * | 12/1995 | Schlagel | 172/151 |
| 5,477,682 A | 12/1995 | Tobiasz | 60/583 |
| 5,477,792 A | 12/1995 | Bassett et al. | 111/121 |
| 5,479,868 A | 1/1996 | Bassett | 111/139 |
| 5,479,992 A | 1/1996 | Bassett | 172/4 |
| 5,485,796 A | 1/1996 | Bassett | 111/33 |
| 5,485,886 A | 1/1996 | Bassett | 172/763 |
| 5,497,717 A | 3/1996 | Martin | 111/127 |
| 5,497,837 A | 3/1996 | Kehrney | 172/619 |
| 5,499,683 A | 3/1996 | Bassett | 172/4 |
| 5,499,685 A | 3/1996 | Downing, Jr. | 172/699 |
| 5,517,932 A | 5/1996 | Ott et al. | 111/193 |
| 5,524,525 A | 6/1996 | Nikkel et al. | 91/179 |
| 5,531,171 A | 7/1996 | Whitesel et al. | 111/121 |
| 5,542,362 A | 8/1996 | Bassett | 111/120 |
| 5,544,709 A | 8/1996 | Lowe et al. | 172/661 |
| 5,562,165 A | 10/1996 | Janelle et al. | 172/4 |
| 5,590,611 A | 1/1997 | Smith | 111/127 |
| 5,603,269 A | 2/1997 | Bassett | 111/52 |
| 5,623,997 A | 4/1997 | Rawson et al. | 172/156 |
| 5,640,914 A | 6/1997 | Rawson | 111/140 |
| 5,657,707 A | 8/1997 | Dresher et al. | 111/139 |
| 5,660,126 A | 8/1997 | Freed et al. | 111/140 |
| 5,685,245 A | 11/1997 | Bassett | 111/62 |
| 5,704,430 A | 1/1998 | Smith et al. | 172/29 |
| 5,709,271 A | 1/1998 | Bassett | 172/4 |
| 5,727,638 A | 3/1998 | Wodrich et al. | 172/414 |
| 5,852,982 A | 12/1998 | Peter | 111/118 |
| 5,868,207 A | 2/1999 | Langbakk et al. | 172/274 |
| 5,878,678 A | 3/1999 | Stephens et al. | 111/139 |
| RE36,243 E | 7/1999 | Rawson et al. | 111/121 |
| 5,970,891 A | 10/1999 | Schlagel | 111/135 |
| 5,970,892 A | 10/1999 | Wendling et al. | 111/139 |
| 5,988,293 A | 11/1999 | Brueggen et al. | 172/414 |
| 6,067,918 A | 5/2000 | Kirby | 111/121 |
| 6,068,061 A * | 5/2000 | Smith et al. | 172/139 |
| 6,164,385 A | 12/2000 | Buchl | 172/239 |
| 6,223,663 B1 | 5/2001 | Wendling et al. | 111/139 |
| 6,223,828 B1 | 5/2001 | Paulson et al. | 171/63 |
| 6,237,696 B1 | 5/2001 | Mayerle | 172/558 |
| 6,253,692 B1 | 7/2001 | Wendling et al. | 111/139 |
| 6,314,897 B1 | 11/2001 | Hagny | 111/192 |
| 6,325,156 B1 | 12/2001 | Barry | 172/518 |
| 6,330,922 B1 | 12/2001 | King | 172/166 |
| 6,331,142 B1 | 12/2001 | Bischoff | 460/112 |
| 6,343,661 B1 | 2/2002 | Thompson et al. | 172/444 |
| 6,347,594 B1 | 2/2002 | Wendling et al. | 111/167 |
| 6,382,326 B1 | 5/2002 | Goins et al. | 172/239 |
| 6,389,999 B1 | 5/2002 | Duello | 111/200 |
| 6,453,832 B1 | 9/2002 | Schaffert | 111/150 |
| 6,454,019 B1 | 9/2002 | Prairie et al. | 172/677 |
| 6,460,623 B1 | 10/2002 | Knussman et al. | 172/4 |
| 6,516,595 B2 | 2/2003 | Rhody et al. | 56/10.2 E |
| 6,530,334 B2 | 3/2003 | Hagny | 111/189 |
| 6,575,104 B2 | 6/2003 | Brummelhuis | 111/139 |
| 6,644,224 B1 | 11/2003 | Bassett | 111/157 |
| 6,701,856 B1 | 3/2004 | Zoke et al. | 111/121 |
| 6,701,857 B1 | 3/2004 | Jensen et al. | 111/200 |
| 6,786,130 B2 | 9/2004 | Steinlage et al. | 91/390 |
| 6,834,598 B2 | 12/2004 | Jüptner | 111/140 |
| 6,840,853 B2 | 1/2005 | Foth | 460/111 |
| 6,886,650 B2 | 5/2005 | Bremmer | 180/89.13 |
| 6,912,963 B2 | 7/2005 | Bassett | 111/163 |
| 6,968,907 B1 * | 11/2005 | Raper et al. | 172/518 |
| 6,986,313 B2 | 1/2006 | Halford et al. | 111/186 |
| 6,997,400 B1 | 2/2006 | Hanna et al. | 239/383 |
| 7,004,090 B2 | 2/2006 | Swanson | 111/119 |
| 7,044,070 B2 | 5/2006 | Kaster et al. | 111/62 |
| 7,063,167 B1 | 6/2006 | Staszak et al. | 172/328 |
| 7,159,523 B2 | 1/2007 | Bourgault et al. | 111/187 |
| 7,222,575 B2 | 5/2007 | Bassett | 111/140 |
| 7,290,491 B2 | 11/2007 | Summach et al. | 111/181 |
| 7,360,494 B2 | 4/2008 | Martin | 111/164 |
| 7,360,495 B1 | 4/2008 | Martin | 111/164 |
| 7,438,006 B2 | 10/2008 | Mariman et al. | 111/164 |
| 7,451,712 B2 | 11/2008 | Bassett et al. | 111/140 |
| 7,523,709 B1 | 4/2009 | Kiest | 111/119 |
| 7,540,333 B2 | 6/2009 | Bettin et al. | 172/744 |
| 7,575,066 B2 | 8/2009 | Bauer | 172/540 |
| 7,584,707 B2 | 9/2009 | Sauder et al. | 111/140 |
| 7,665,539 B2 | 2/2010 | Bassett et al. | 172/540 |
| 7,673,570 B1 | 3/2010 | Bassett | 111/63 |
| 7,743,718 B2 | 6/2010 | Bassett | 111/135 |
| 7,870,827 B2 | 1/2011 | Bassett | 111/119 |
| 7,938,074 B2 | 5/2011 | Liu | 111/200 |
| 7,946,231 B2 | 5/2011 | Martin et al. | 111/60 |
| 8,146,519 B2 | 4/2012 | Bassett | 111/119 |
| 8,151,717 B2 | 4/2012 | Bassett | 111/135 |
| 8,327,780 B2 | 12/2012 | Bassett | 111/119 |
| 8,359,988 B2 | 1/2013 | Bassett | 111/135 |
| 8,380,356 B1 | 2/2013 | Zielke et al. | 700/284 |
| 8,386,137 B2 | 2/2013 | Sauder et al. | 701/50 |
| 8,393,407 B2 | 3/2013 | Freed | 172/551 |
| 8,408,149 B2 | 4/2013 | Rylander | 111/140 |
| 8,544,397 B2 | 10/2013 | Bassett | 111/167 |
| 8,544,398 B2 | 10/2013 | Bassett | 111/167 |
| 8,550,020 B2 | 10/2013 | Sauder et al. | 111/200 |
| 8,573,319 B1 | 11/2013 | Casper et al. | 172/4 |
| 8,634,992 B2 | 1/2014 | Sauder et al. | 701/50 |
| 8,636,077 B2 | 1/2014 | Bassett | 172/195 |
| 2002/0162492 A1 | 11/2002 | Juptner | 111/140 |
| 2006/0102058 A1 | 5/2006 | Swanson | 111/119 |
| 2006/0191695 A1 | 8/2006 | Walker et al. | 172/452 |
| 2006/0237203 A1 | 10/2006 | Miskin | 172/799.5 |
| 2007/0044694 A1 | 3/2007 | Martin | 111/121 |
| 2007/0272134 A1 | 11/2007 | Baker et al. | 111/163 |
| 2008/0093093 A1 | 4/2008 | Sheppard et al. | 172/2 |
| 2008/0236461 A1 | 10/2008 | Sauder et al. | 111/170 |
| 2008/0256916 A1 | 10/2008 | Vaske et al. | 56/13.5 |
| 2010/0019471 A1 | 1/2010 | Ruckle et al. | 280/504 |
| 2010/0108336 A1 | 5/2010 | Thomson et al. | 172/795 |
| 2010/0180695 A1 | 7/2010 | Sauder et al. | 73/862.045 |
| 2010/0198529 A1 | 8/2010 | Sauder et al. | 702/41 |
| 2010/0282480 A1 | 11/2010 | Breker et al. | 172/170 |
| 2011/0247537 A1 | 10/2011 | Freed | 111/140 |
| 2011/0313575 A1 | 12/2011 | Kowalchuk et al. | 700/282 |
| 2012/0167809 A1 | 7/2012 | Bassett | 111/119 |
| 2012/0186216 A1 | 7/2012 | Vaske et al. | 56/367 |
| 2012/0210920 A1 | 8/2012 | Bassett | 111/140 |
| 2012/0216731 A1 | 8/2012 | Schilling et al. | 111/69 |
| 2012/0232691 A1 | 9/2012 | Green et al. | 700/231 |
| 2012/0255475 A1 | 10/2012 | Mariman et al. | 111/149 |
| 2012/0305274 A1 | 12/2012 | Bassett | 172/5 |
| 2013/0032363 A1 | 2/2013 | Curry et al. | 172/4 |
| 2013/0112121 A1 | 5/2013 | Achen et al. | 111/14 |
| 2013/0112124 A1 | 5/2013 | Bergen et al. | 111/151 |
| 2013/0133904 A1 | 5/2013 | Bassett | 172/239 |
| 2013/0146318 A1 | 6/2013 | Bassett | 172/5 |
| 2013/0192186 A1 | 8/2013 | Bassett | 56/10.2 E |
| 2013/0199808 A1 | 8/2013 | Bassett | 172/260.5 |
| 2013/0213676 A1 | 8/2013 | Bassett | 172/260.5 |

(56) References Cited

U.S. PATENT DOCUMENTS

| | | | |
|---|---|---|---|
| 2013/0248212 A1 | 9/2013 | Bassett | 172/4 |
| 2013/0264078 A1 | 10/2013 | Bassett | 172/260.5 |
| 2013/0306337 A1 | 11/2013 | Bassett | 172/260.5 |
| 2013/0333599 A1 | 12/2013 | Bassett et al. | 111/62 |
| 2014/0026748 A1 | 1/2014 | Stoller et al. | 91/418 |
| 2014/0026792 A1 | 1/2014 | Bassett | 111/121 |
| 2014/0033958 A1 | 2/2014 | Bassett | 111/193 |
| 2014/0034339 A1 | 2/2014 | Sauder et al. | 172/2 |
| 2014/0034343 A1 | 2/2014 | Sauder et al. | 172/664 |
| 2014/0034344 A1 | 2/2014 | Bassett | 172/5 |
| 2014/0048001 A1 | 2/2014 | Bassett | 111/59 |
| 2014/0048295 A1 | 2/2014 | Bassett | 172/2 |
| 2014/0048296 A1 | 2/2014 | Bassett | 172/4 |
| 2014/0048297 A1 | 2/2014 | Bassett | 172/4 |

FOREIGN PATENT DOCUMENTS

| | | | |
|---|---|---|---|
| DE | 335464 | 9/1921 | |
| DE | 1108971 | 6/1961 | |
| DE | 24 02 411 | 7/1975 | |
| EP | 2 497 348 A1 | 9/2012 | A01B 79/00 |
| GB | 1 574 412 | 9/1980 | 111/123 |
| GB | 2 056 238 A | 10/1982 | |
| JP | 54-57726 | 5/1979 | 74/529 |
| SU | 392897 | 8/1973 | |
| SU | 436778 | 7/1974 | |
| SU | 611201 | 6/1978 | 74/527 |
| SU | 625648 | 9/1978 | |
| SU | 1410884 A1 | 7/1988 | |
| SU | 1466674 | 3/1989 | 111/124 |
| WO | WO 2011/161140 A1 | 12/2011 | A01C 7/20 |
| WO | WO 2012/149367 A1 | 1/2012 | A01C 5/00 |
| WO | WO 2012/149415 A1 | 1/2012 | A01B 63/111 |
| WO | WO 2012/167244 A1 | 12/2012 | A01B 5/00 |
| WO | WO 2013/025898 A1 | 2/2013 | B60C 23/02 |

OTHER PUBLICATIONS

Buffalo Farm Equipment All Flex Cultivator Operator Manual, Apr. 1990 (7 pages).
Shivvers, Moisture Trac 3000 Brochure, Aug. 21, 1990 (5 pages).
The New Farm, "*New Efficiencies in Nitrogen Application*," Feb. 1991, p. 6 (1 page).
Hiniker Company, Flow & Acreage Continuous Tracking System Monitor Demonstration Manuel, date estimated as early as Feb. 1991 (7 pages).
Russnogle, John, "*Sky Spy: Gulf War Technology Pinpoints Field and Yields*," Top Producer, A Farm Journal Publication, Nov. 1991, pp. 12-14 (4 pages).
Borgelt, Steven C., "*Sensor Technologies and Control Strategies for Managing Variability*," University of Missouri, Apr. 14-16, 1992 (15 pages).
Buffalo Farm Equipment Catalog on Models 4600, 4630, 4640, and 4620, date estimated as early as Feb. 1992 (4 pages).
Hiniker 5000 Cultivator Brochure, date estimated as early as Feb. 1992 (4 pages).
Hiniker Series 5000 Row Cultivator Rigid and Folding Toolbar Operator's Manual, date estimated as early as Feb. 1992 (5 pages).
Orthman Manufacturing, Inc., Rowcrop Cultivator Booklet, date estimated as early as Feb. 1992 (4 pages).
Yetter Catalog, date estimated as early as Feb. 1992 (4 pages).
Exner, Rick, "*Sustainable Agriculture: Practical Farmers of Iowa Reducing Weed Pressure in Ridge-Till*," Iowa State University University Extension, http://www.extension.iastate.edu/Publications/SA2.pdf, Jul. 1992, Reviewed Jul. 2009, retrieved Nov. 2, 2012 (4 pages).
Finck, Charlene, "*Listen to Your Soil*," Farm Journal Article, Jan. 1993, pp. 14-15 (2 pages).
Acu-Grain, "*Combine Yield Monitor 99% Accurate? 'You Bet Your Bushels!!*'" date estimated as early as Feb. 1993 (2 pages).
John Deere, New 4435 Hydro Row-Crop and Small-Grain Combine, date estimated as early as Feb. 1993 (8 pages).
Vansichen, R. et al., "*Continuous Wheat Yield Measurement on a Combine*," date estimated as early as Feb. 1993 (5 pages).
Yetter 2010 Product Catalog, date estimated as early as Jan. 2010 (2 pages).
Yetter Cut and Move Manual, Sep. 2010 (28 pages).
John Deere, Seat Catalog, date estimated as early Sep. 2011 (19 pages).
Martin Industries, LLC Paired 13" Spading Closing Wheels Brochure, date estimated as early as Jun. 6, 2012, pp. 18-25 (8 pages).
Vogt, Willie, "*Revisiting Robotics*," http://m.farmindustrynews.com/farm-equipment/revisiting-robotics, Dec. 19, 2013 (3 pages).
John Deere, New Semi-Active Sea Suspension, http://www.deere.com/en_US/parts/agparts/semiactiveseat.html, date estimated as early as Jan. 2014, retrieved Feb. 6, 2014 (2 pages).

\* cited by examiner

AGRICULTURAL FIELD PREPARATION DEVICE

FIELD

The present disclosure is generally directed to agricultural devices, and is more particularly directed to an agricultural device configured to prepare a field, such as planting, within mature crops.

BACKGROUND

"No till" farming has recently gained popularity among conservationists and economically minded farmers as a way to reduce erosion, fuel consumption, irrigation and fertilizer runoff. The "no till" concept removes the step of tilling a previous crop prior to planting the next successive crop. In the past, this concept has been applied to not tilling between the stubble from a previous crop prior to planting the next successive crop.

What is needed is a method and system for performing several operations in the field consistent with "no-till" or reduced tillage farming, such as seeding between rows of standing cover crops, which cover crops being planted after harvest of a primary crop.

SUMMARY OF THE DISCLOSURE

In an exemplary embodiment, an agricultural device is disclosed that is configured for performing several operations in the field consistent with "no-till" or reduced tillage farming.

According to one embodiment, an agricultural device associated with reduced tillage techniques in a field includes a frame, and a separator supported by the frame. The separator is configured to form a strip of exposed soil in residual plant matter in the field. A crimping device is associated with the separator, the device configured to at least partially crush stems of residual plant matter while maintaining the strip.

According to another embodiment of the present disclosure, an agricultural planter usable with reduced tillage techniques in a field includes an apparatus having a frame for positioning seed in the field. A separator supported by the frame, the separator is configured to form a strip of exposed soil in residual plant matter in the field. A crimping device associated with the separator, the device is configured to at least partially crush stems of residual plant matter while maintaining the strip for receiving seed from the apparatus.

According to another embodiment of the present disclosure, a method for achieving reduced tillage techniques in a field includes forming a strip of exposed soil in residual plant matter in the field. The method further includes at least partially crushing stems of residual plant matter while maintaining the strip, wherein forming a strip and crushing stems are achieved in a single pass along the field.

An advantage of the present disclosure is to provide a device associated with reduced tillage techniques in the field.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION

The present disclosure now will be described more fully hereinafter with reference to the accompanying drawings, in which preferred embodiments of the disclosure are shown. This disclosure may, however, be embodied in many different forms and should not be construed as limited to the embodiments set forth herein; rather, these embodiments are provided so that this disclosure will be thorough and complete and will fully convey the scope of the disclosure to those skilled in the art.

Figure 1:
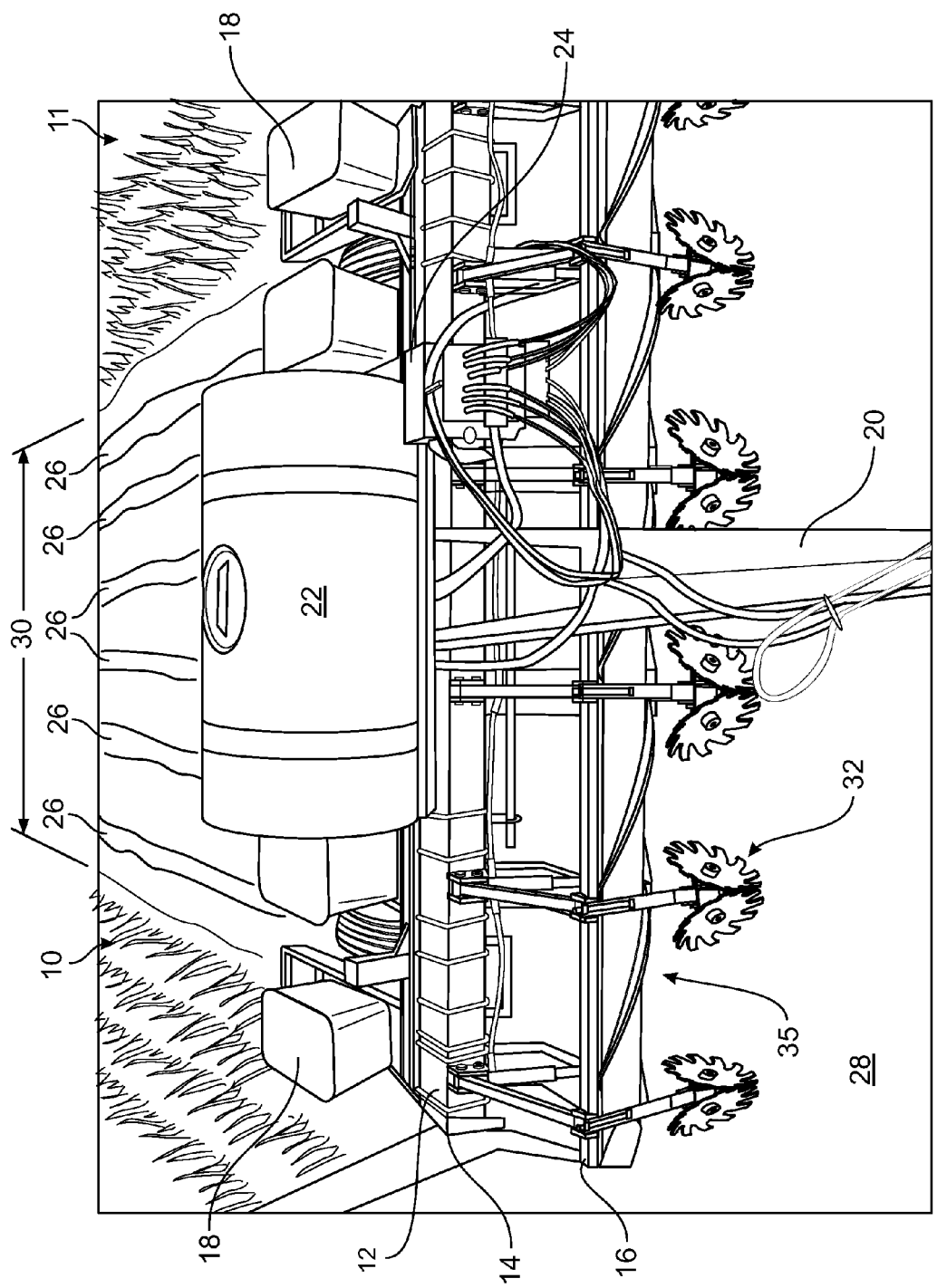
FIG. 1 shows an upper perspective view of an agricultural device according to an embodiment of the present disclosure.

FIG. 1 shows an embodiment of an agricultural device 10 according to the present disclosure in operation in a field 11. The agricultural device 10 includes a frame 12 that further includes a base frame 14 and a secondary frame 16. A seed container 18 is supported by frame 12. As further shown, frame 12 includes components associated with a conventional planter. However, the frame is not limited to a planter, and may be incorporated into a different agricultural implement or device, such as a strip tilling machine, e.g., to crush cornstalks or other residue during the fall or other time of year for clearing a strip for the next crop, or use with other types of machines or applications. It is to be understood while other machines or apparatus may also be operatively connected to the agricultural device or to a vehicle, such as a tractor or apparatus generally or specifically configured for use with the agricultural device, the other machines or apparatus may or may not be used in combination with the agricultural device. As shown, agricultural device 10 includes a tongue 20 that is towed by a vehicle such as a tractor (not shown). In one embodiment, the agricultural device may be operatively connected, i.e., towed by or otherwise secured to a vehicle, such as a tractor or apparatus generally or specifically configured for use with the agricultural device, and may be used with another implement or application, or used without another implement. In other words, the agricultural device may be operatively connected to either an implement or to a vehicle, although the agricultural device may be used by itself or in combination with another implement. Frame 12 is shown supporting a vessel 22 configured to contain a material to apply to the field, or for purposes of providing ballast for desired operation of device 10. A hydraulic fluid manifold 24 is associated with other components utilized to manipulate a separator 32 in a crimping device 35, as will be discussed in additional detail below.

FIG. 1 further shows numerous (six) separators 32 encountering residual plant matter 28, such as a small grain cover crop, which can include, but is not limited to, barley, wheat, oats, spelts, or rye. In another embodiment clover may be planted. In yet another embodiment, weeds can be planted. In another embodiment, agricultural device 10 may utilize more than six separators or less than six separators. Each separator 32 forms a strip 26 of exposed soil in the residual plant matter 28. Immediately after encountering separators 32, the residual plant matter 28 encounters a crimping device 35 that is configured to at least partially crush stems of the residual plant matter 28, while maintaining each strip 26 formed by a corresponding separator 32. That is, as further shown in FIG. 1, a region of crushed residual plant matter 30 remaining after a single pass of agricultural device 10 maintains, or does not "cover up" with the crushed residual plant matter 30, the exposed strips 26 initially formed by separators 32. Since strip 26 is maintained by a corresponding separator 32, the positioning of crimping devices 35 relative to corresponding separators 32 does not affect the operation of agricultural device 10. Therefore, in another embodiment, one or more of crimping devices 35 may be positioned to encounter the residual plant matter prior to corresponding separators 32 encountering the residual plant matter.

The cover crops shown in FIG. 1, are typically planted after the primary crop has been harvested, such as corn, in order to reduce compaction of the soil. The type of field preparation shown in FIG. 1 occurring simultaneously with crushing of the residual plant matter 30 or cover crop is planting of a primary crop, such as corn. However, the agricultural device of the present disclosure is not limited to planting, and may include spreading fertilizer or other type of field preparation associated with "no-till" or other types of reduced tillage techniques, such as strip-tilling, if desired.

Multiple benefits may be derived by the combination of the separator 32 used in combination with crimping device 35 of the agricultural device of the present disclosure. For example, FIG. 1 shows the capability of planting a primary crop in a single pass in each of the strips 26, despite the presence of a standing or established growth of residual plant matter 28 in the field. Additionally, due to exposing the strips 26, at least partially crushing stems of the residual plant matter 28, the agricultural device 10, such as a conventional planter, which is well known and will not be discussed in further detail herein, deposits seed of the primary crop in the strips 26, and also covers the crop seed in the strips 26. Each of the above-identified actions (separating the residual plant matter 28 or cover crop, crushing stems of the residual plant matter 28, and planting seeds (which includes opening a trench, positioning the crop seed in the trough, and then closing the trough to cover the seed) all occur within the same pass of the agricultural device.

Further, crimping device 35, when adjusted properly, the capability of which adjustment will be discussed in further detail below, the crushed residual plant matter 30 provides numerous benefits. First, the crushed residual plant matter 30 is effectively terminated or destroyed and remains in contact or in close proximity with the surface of the soil, returning nutrients to the soil, such as nitrogen, and thereby reducing the amount of fertilizer that must be subsequently applied to grow the primary crop. Second, the crushed residual plant matter 30 remaining in contact with or in close proximity with the surface of the soil helps maintain moisture in the soil. It has been shown that such increased moisture retention directly results in an increased yield of the primary crop. Third, by virtue of the crushed residual plant matter 30 remaining in contact or in close proximity with the surface of the soil, a toxin is released. The particulars of such toxin release are known to those skilled in the art and not further discussed herein. However, as a result of such toxin release, and not merely the presence of a layer of crushed residual plant matter blocking sunlight from reaching the soil surface between the strips 26, weed growth is substantially diminished without application of herbicides, although in some applications or environments, a reduced amount of herbicide may be applied. Fourth, the presence of the residual plant matter 28 or cover crop, by virtue of the root mass of the residual plant matter 28, significantly reduces soil erosion that would otherwise occur without such ground cover after harvest of the primary crop.

Figure 2:
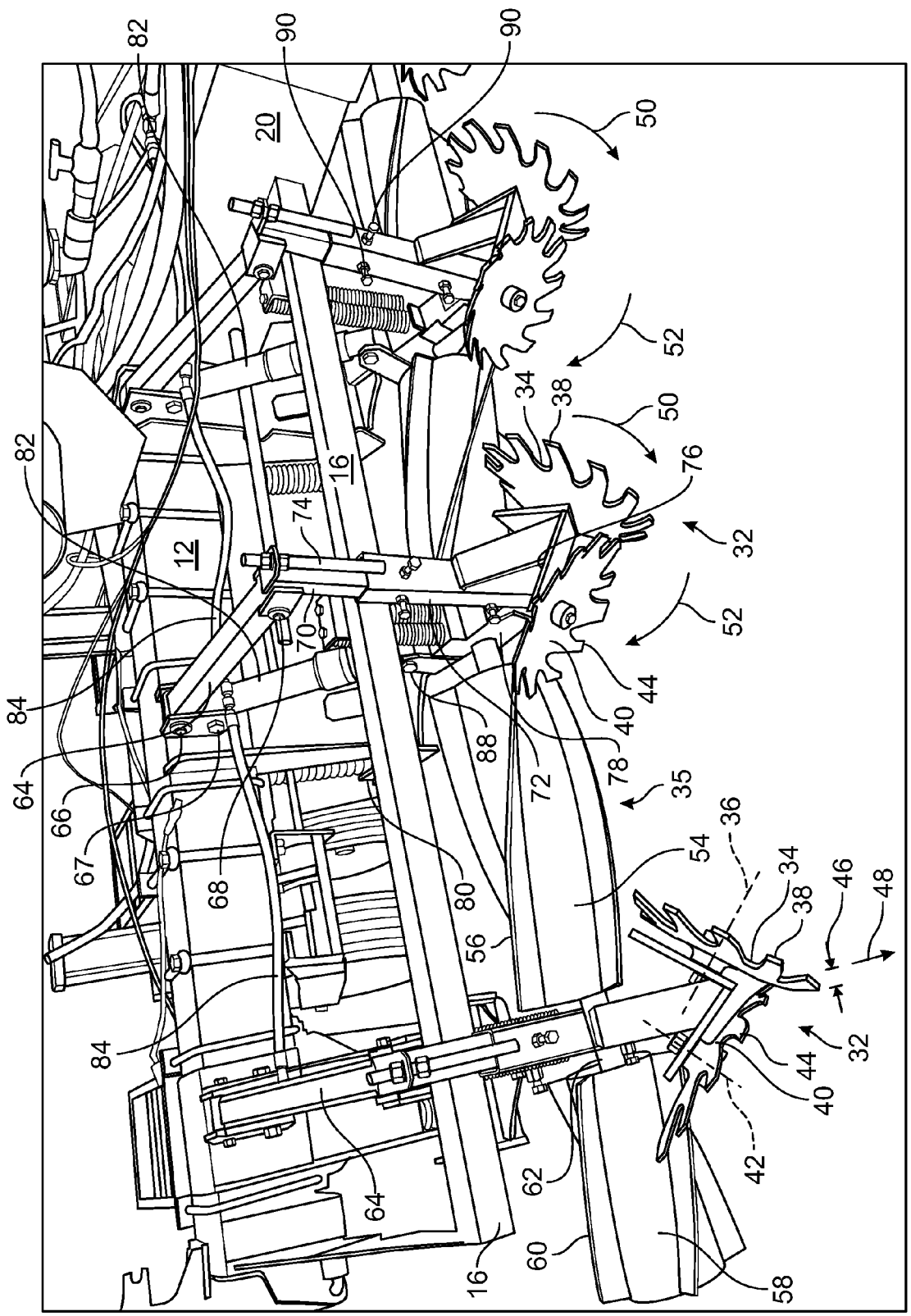
FIG. 2 shows an enlarged, partial perspective view of the agricultural device according to an embodiment of FIG. 1.
Figure 3:
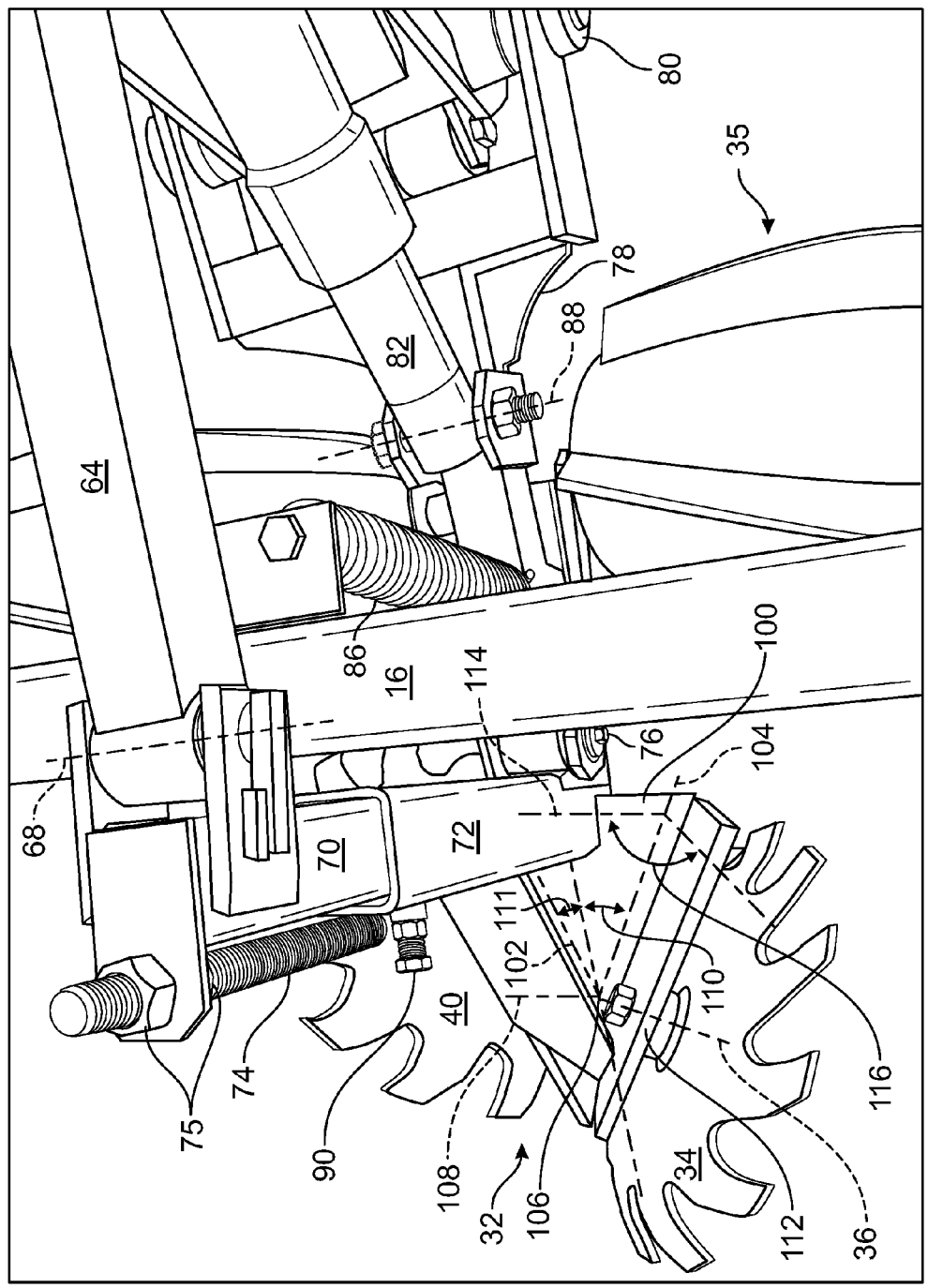
FIG. 3 shows an enlarged, partial perspective view of the agricultural device according to an embodiment of FIG. 1.
Figure 4:
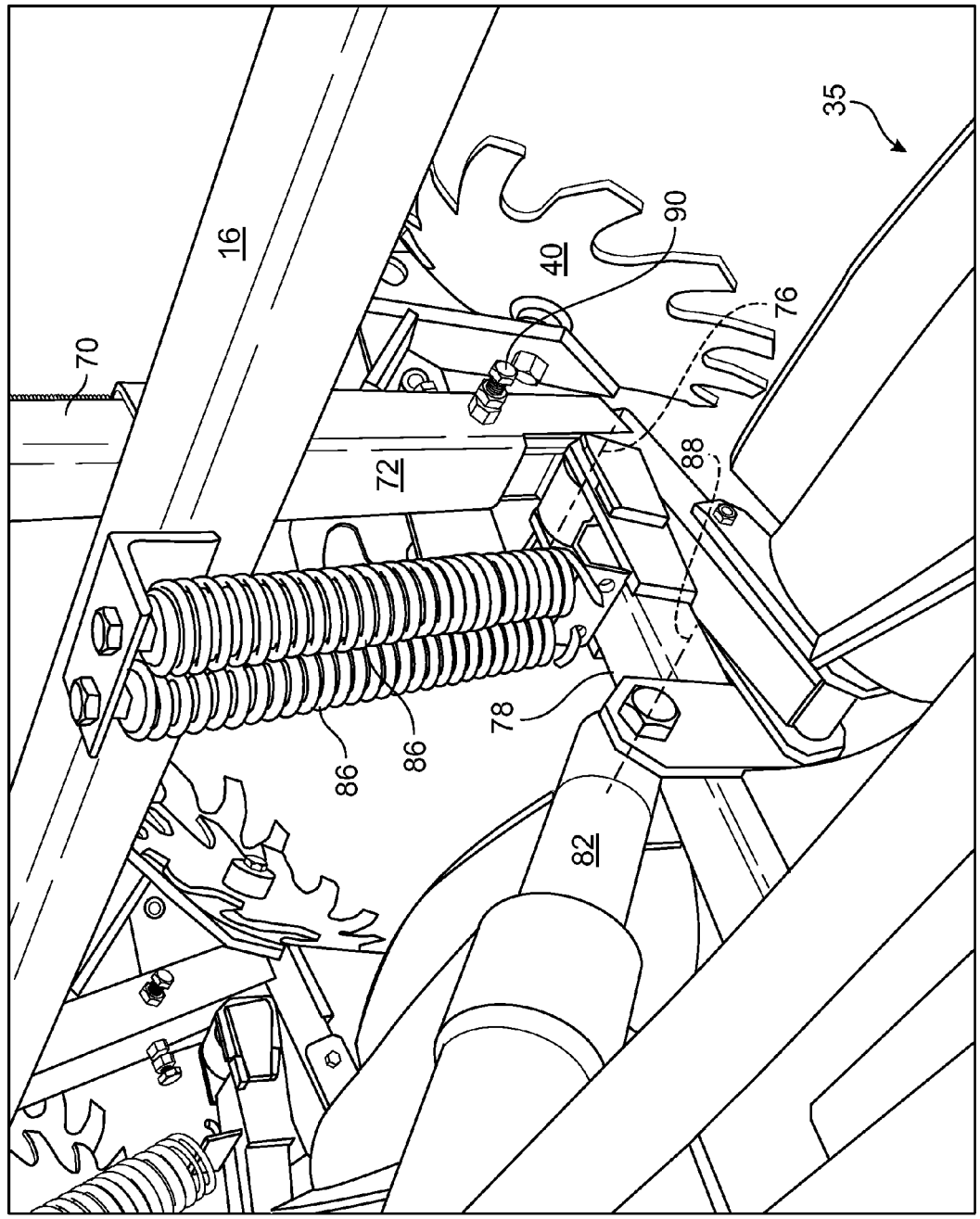
FIG. 4 shows a reverse, partial perspective view of the agricultural device according to an embodiment of FIG. 1.

FIGS. 2-5 show additional details of separator 32 in crimping device 35. Multiple structural members are supported by frame 12, which includes base frame 14 and secondary frame 16 as previously discussed. As further shown in the figures, one side of the agricultural device includes three sets of structural members to be discussed below. A structural member 64 includes a pivotable connection 66 at one end to frame 12, and a pivotable connection 68 with a structural member 70 at the other end of structural member 64. Similarly, structural member 70 includes pivotable connection 68 with structural member 64 at one end, and a pivotable connection 76 with a structural member 78 at the other end of structural member 70. An adjustment member 74, such as a threaded rod, is secured between structural member 70 and adjustable sleeve 72, which relative adjustable movement between structural member 70 and adjustable sleeve 72 being achieved by manipulation of fasteners 75 (FIG. 3). As further shown in the figures, stabilizers 90 extend through the walls of adjustable sleeve 72 toward the surface of structural member 70. By the stabilizers 90 extending through the walls of adjustable sleeve 72 toward structural member 70, the spacing, and therefore, relative movement between the walls of adjustable sleeve 72 and structural member 70 is achieved. The reduction of such relative movement 70 similarly reduces movement of separator 32 (which is affixed to adjustable sleeve 72) with respect to the agricultural device during operation of the agricultural device, such movement sometimes referred to as "wobble". In addition, a structural member 78 includes pivotable connection 76 at one end to structural member 70, and a pivotable connection 80 with frame 12. In other words, structural members 64, 70, 78 form an interconnected pivotably movable framework, sometimes referred to as a four bar mechanism. It is to be understood that other linkage configurations could also be used to achieve similar motions concerning the frame components.

Figure 5:
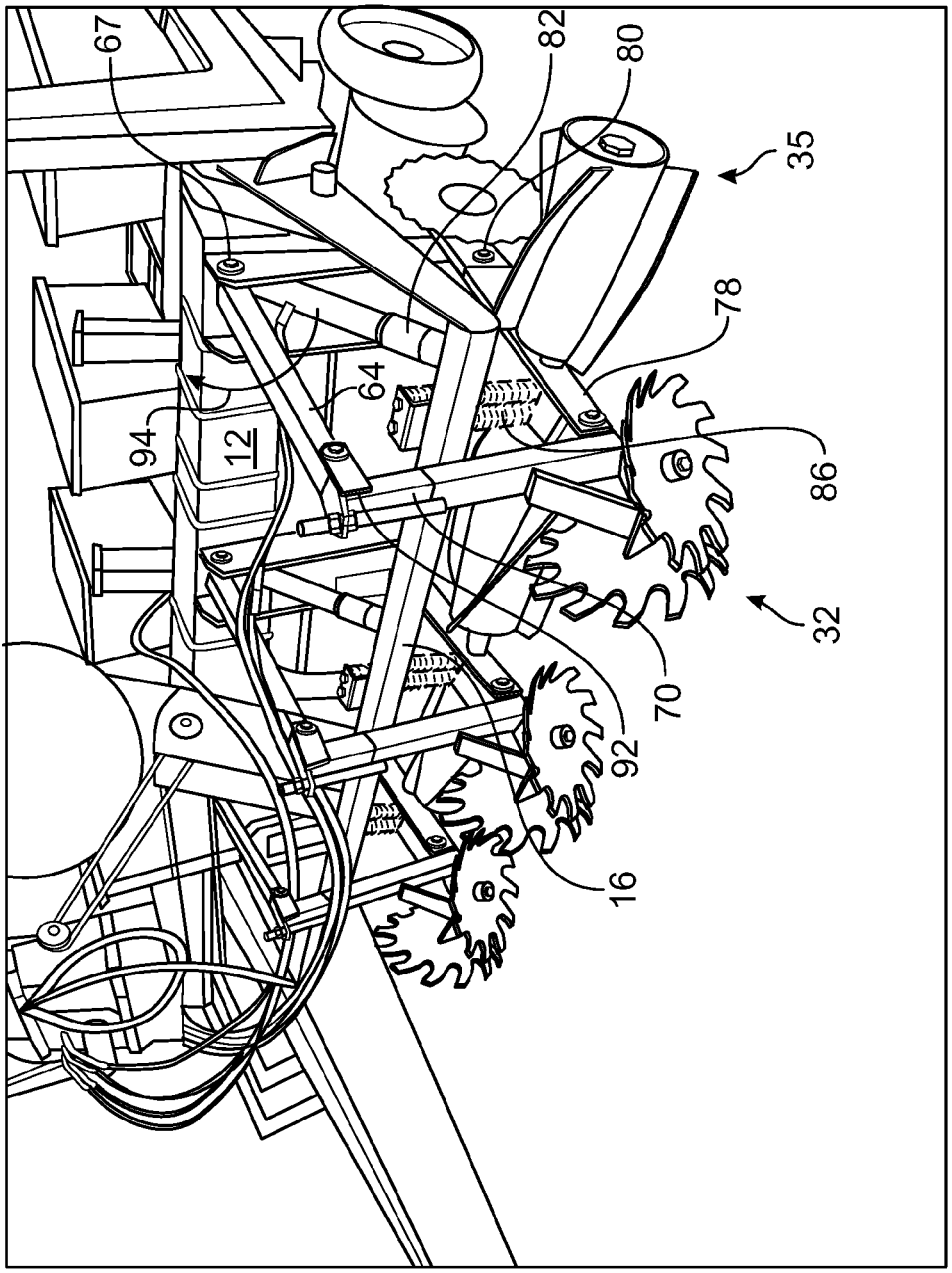
FIG. 5 shows a partial upper perspective view of the agricultural device according to an embodiment of FIG. 1 in a raised position.
Figure 6:
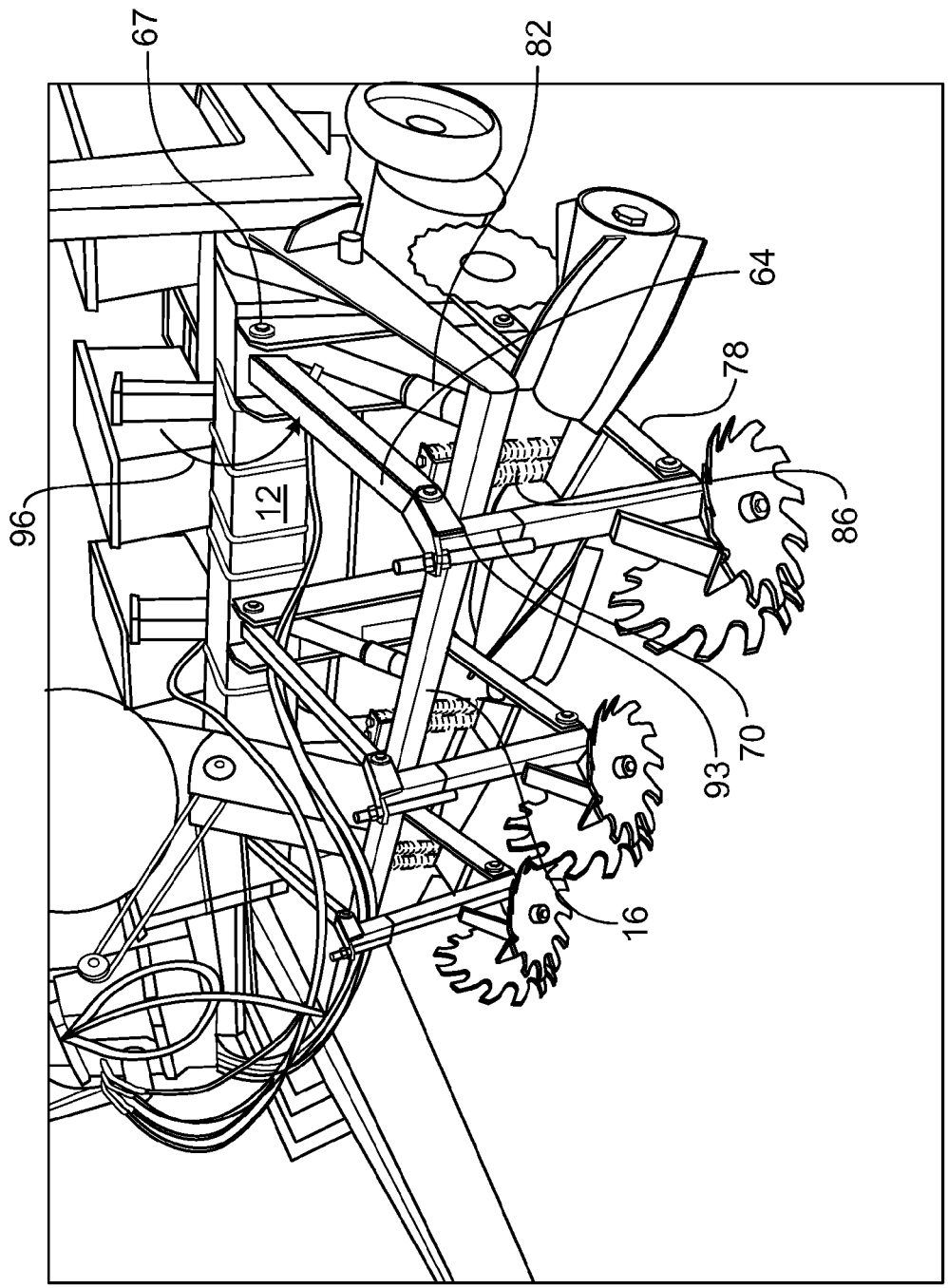
FIG. 6 shows a partial upper perspective view of the agricultural device according to an embodiment of FIG. 1 in a lowered position.
Figure 7:
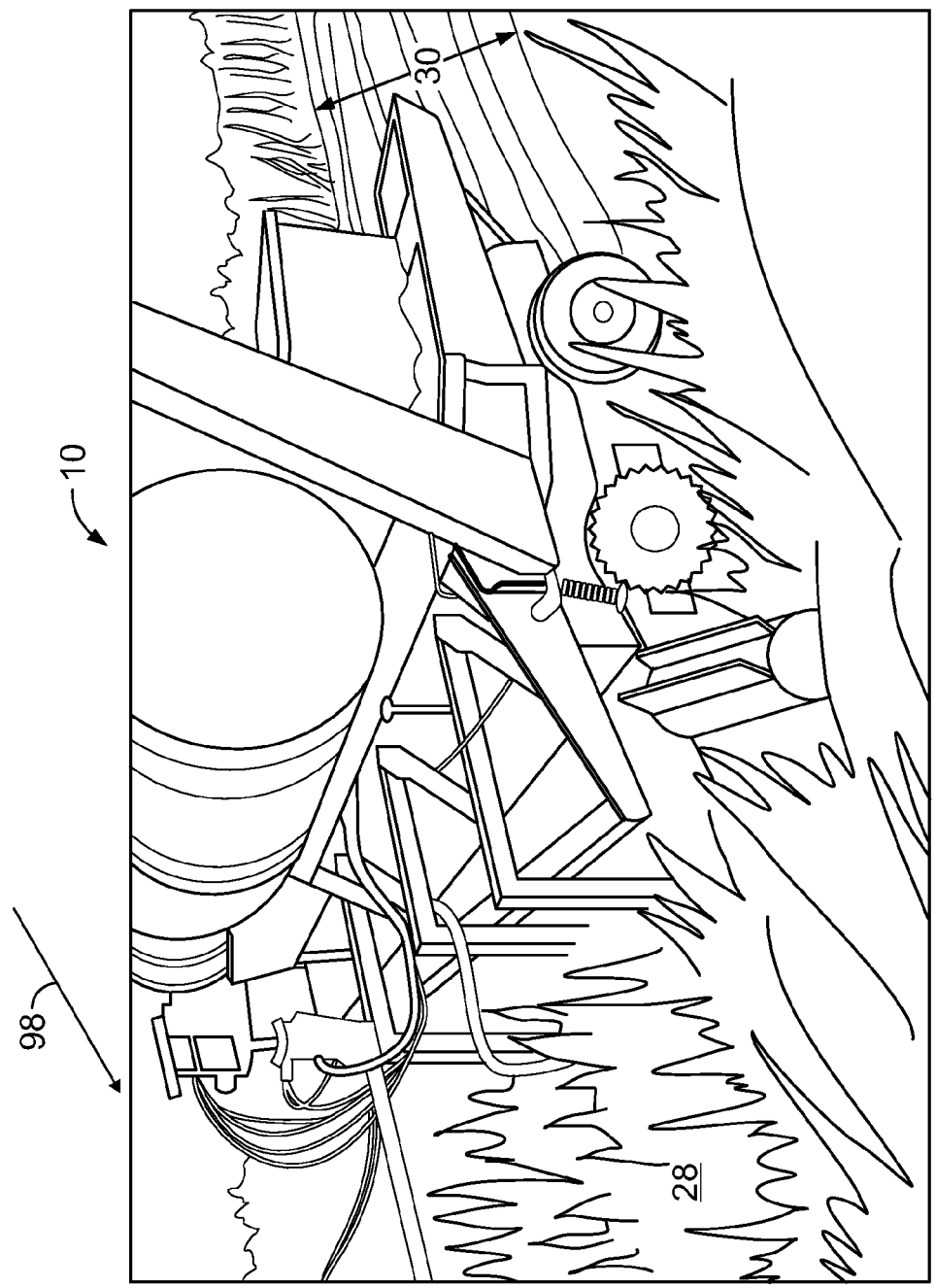
FIGS. 7-9 show views of the agricultural device according to an embodiment of FIG. 3 in incremental progression, respectively, of the device encountering standing residual plant matter, immediately after the device has encountered residual plant matter, and a forward looking view primarily showing the substantially crushed residual plant matter a predetermined time after the device has encountered the residual plant matter.
Figure 8:
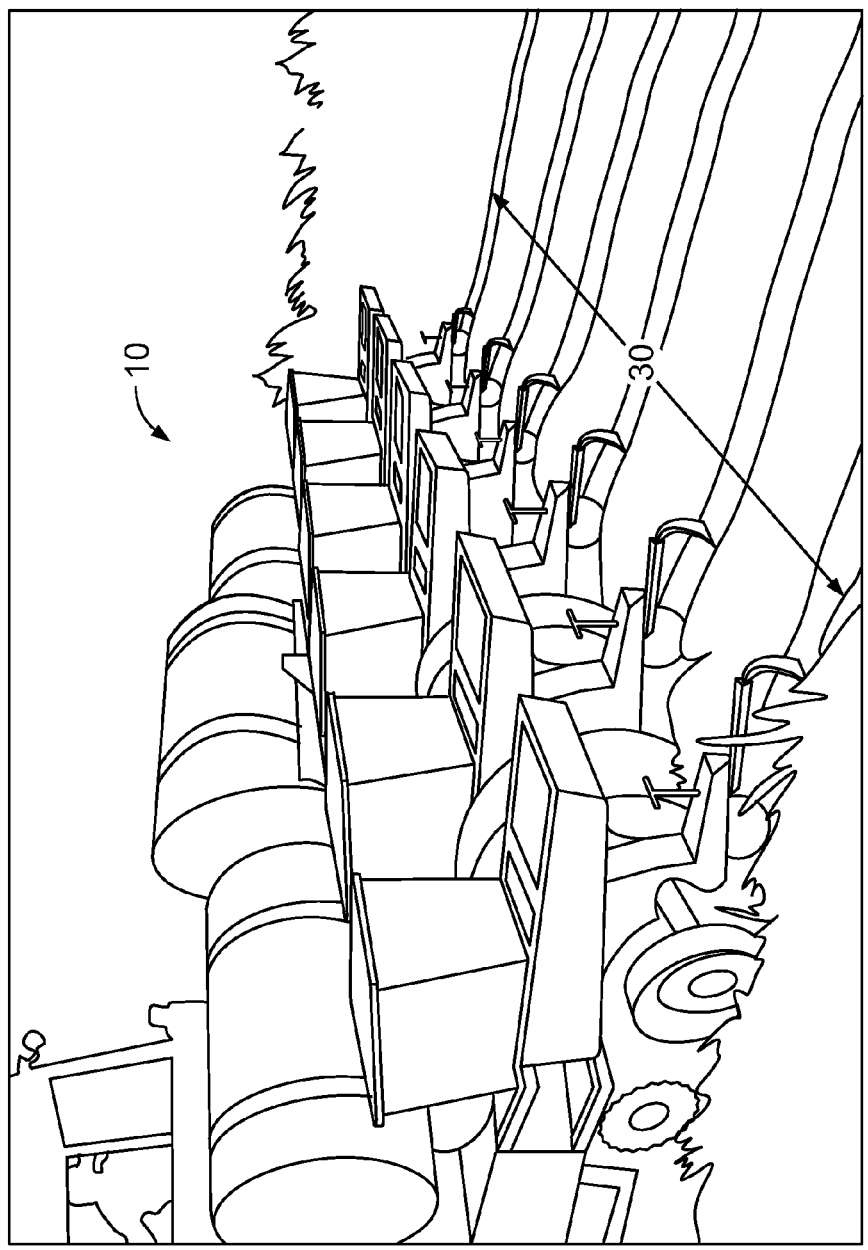
Figure 9:
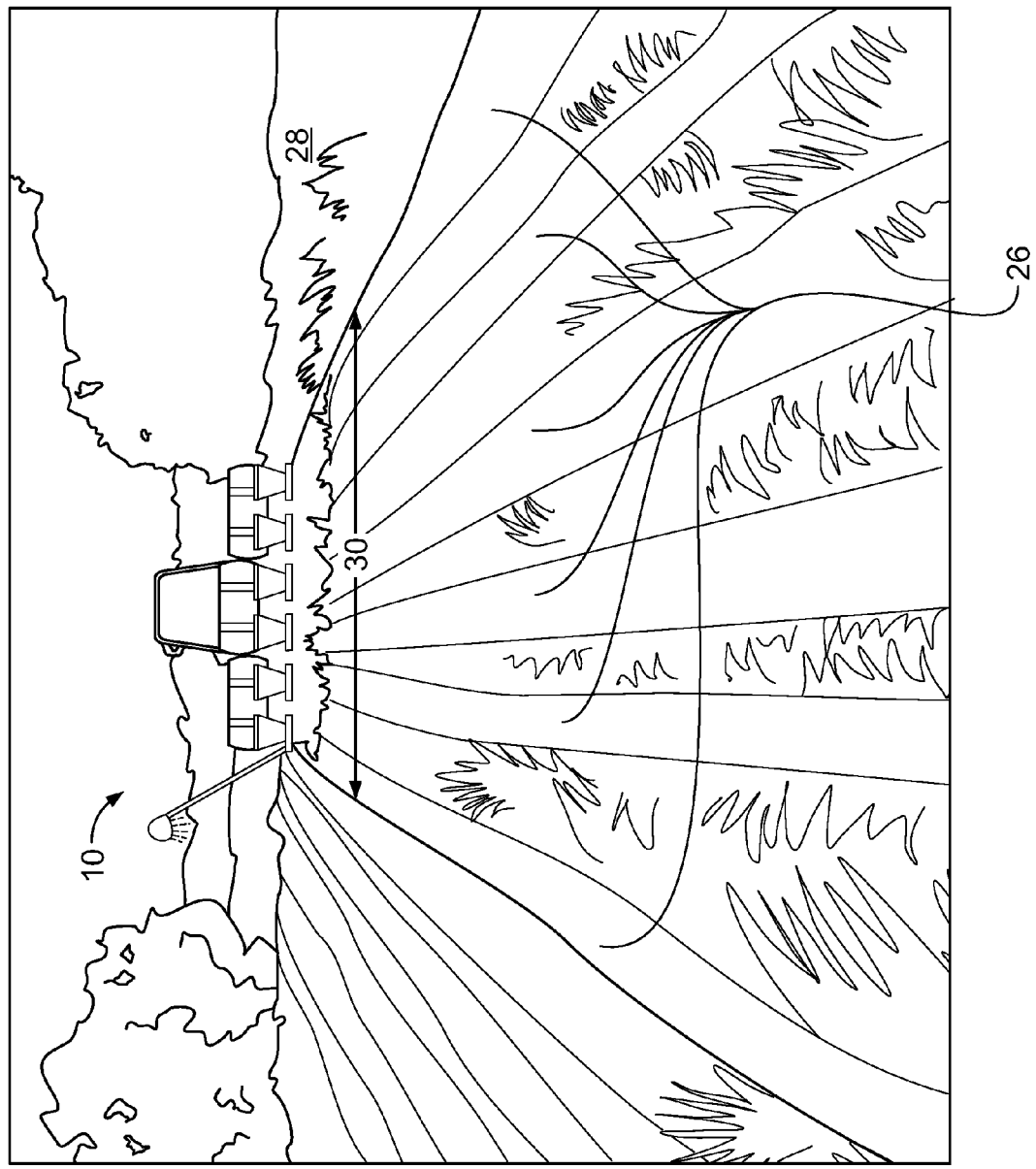
Figure 10:
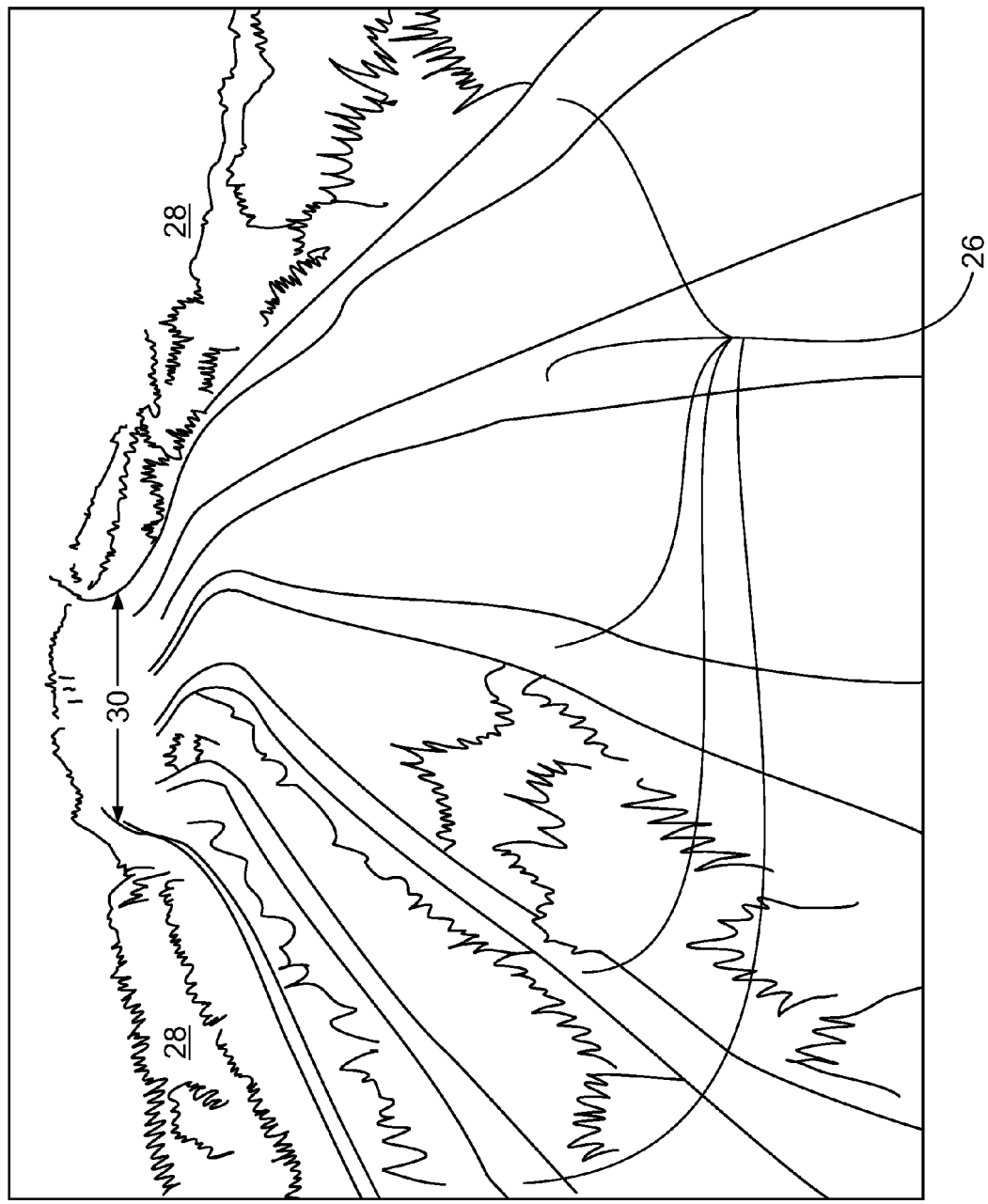
FIG. 10 shows a swath resulting from a single pass of the agricultural device through a field containing standing residual plant matter.

As shown in the figures, to control the collective orientation of interconnected structural members 64, 70, 78 to frame 12, a hydraulic ram 82 includes a pivotable connection 67 at one end with frame 12, and a pivotable connection 88 with structural member 78 at the other end of hydraulic ram 82. Interconnected fluid lines 84 are provided to each hydraulic ram 82 from a source of hydraulic pressure (not shown) to maintain an equal pressure and therefore equal force as applied by each hydraulic ram 82. A return member 86, such as one or more helical springs, is secured at one end to secondary frame 16, and to structural member 78 at the other end of the return member 86. Since return member 86 is positioned to oppose the extension force applied by hydraulic ram 82, when the force applied by a hydraulic ram 82 is less than the retention force applied by the return member 86, the effective length of return member 86 is shortened, urging pivotable rotation of structural members 64, 70, 78 about corresponding pivotable connections 66 and 80. Stated another way, FIG. 5 shows the force interaction between return member 86 and hydraulic ram 82, resulting in a raised position 92 or movement in a rotational direction 94 of structural members 64, 70, 78 in response to the retention force of return member 86 exceeding the extension force applied by hydraulic ram 82. Conversely, FIG. 6 shows the force interaction between return member 86 and hydraulic ram 82, resulting in a lowered position 93 or movement in a rotational direction 96 of structural members 64, 70, 78 in response to the retention force of return member 86 being less than and overcome by the extension force applied by hydraulic ram 82.

By virtue of equal forces being maintained in the hydraulic rams 82, an amount of flexibility results in response to the agricultural device encountering uneven terrain. That is, in response to a portion of the agricultural device encountering a non-uniform region in the field, such as a protrusion, portions or segments of the crimping device 35, which collectively bears a variable portion of the weight of the device in proportion to the position or length of the hydraulic ram 82, which weight being applied to the soil (or residual plant matter growing out of the soil), shift position in response to portions or segments of the crimping device 35 being subjected to a temporary increase in resistance, because each portion or segment of the crimping device 35 maintains a constant force in comparison with each other. In other words, a portion or segment of the crimping device 35 receiving an increase in resistance will raise with respect to other portions or segments of the crimping device 35, in order to maintain the constant force applied by the hydraulic rams 82. However in an alternate embodiment, different portions or segments of the crimping device can be configured to generate different amounts of force from one another.

Another aspect of the disclosure is that the hydraulic pressure is adjustable by the user, permitting reduced or increased forces to be applied by the hydraulic ram 82, which force variations can change the application of use of the crimping devices and the separator. That is, it may be desirable to make a pass over the crop row after fertilizer, such as manure or other type of fertilizer has been applied by a fertilizing device. For example, breaking larger clumps of manure into smaller pieces requires a significantly reduced amount of force than for other applications, such as planting seeds and crushing residual plant matter.

It is to be understood that in other embodiments, orientation control of the interconnected structural members may be effected by devices other than hydraulic rams, such as pneumatically or electrically powered actuators. Returning to FIGS. 2-5, separator 32 includes a pair of disks 34, 40 extending from the front of the agricultural device. As further shown in the figures, disks 34, 40 are urged into respective rotational movement when brought into contact with the ground or sufficiently close contact with the ground and in contact with the residual plant matter 28 (FIG. 1). Disks 34, 40 rotate about respective axes of rotation 36, 42 that may be substantially perpendicular to each other, and angled with respect to a travel direction 48 of the agricultural device. As further shown in FIG. 3, separator 32 includes a base structure 100 defining a triangle having an apex 106 and edges 102, 104 extending from apex 106. Travel direction 48 of the agricultural device bisects the angle formed between edges 102, 104 of base structure 100. That is, deviation angle 110, also sometimes referred to as "twist" or yaw, is measured by rotating about a vertical axis 108 between travel direction 48 and edge 104, which deviation angle 110 corresponds to disk 34. Similarly, deviation angle 111, which is measured by rotating vertical axis 108 between travel direction 48 and edge 102, corresponds to the deviation angle for disk 40. As shown, deviation angles 110, 111 are equal and are about 30 degrees. In another embodiment, the deviation angles are not equal to each other. In other embodiments, deviation angles could range from about 10 degrees to about 35 degrees.

As further shown FIG. 3, separator 32 includes a plate structure 112 through which axis of rotation 36 is formed to permit rotation of disk 34. A tilt angle 116 for disk 34 is measured by rotating about edge 104 from a vertical axis 114 to plate structure 112. As shown in FIG. 3, tilt angle 116 is about 25 degrees. As shown in the figures, the tilt angles for the disk pairs 34, 40 are equal to each other. In another embodiment, the tilt angles are not equal to each other. In other embodiments, tilt angles could range from zero to about 35 degrees.

It is to be understood that either of the disk pairs of the separator can include any combination of deviation angle and tilt angle, achieving a resulting compound angle.

In response to disks 34, 40 being brought into contact with the ground and/or in contact with the residual plant matter 28, peripheral surface features 38, such as teeth for disk 34 and peripheral surface features 44, such as teeth for disk 40 are urged into respective rotational movement 50, 52. As shown, peripheral surface features 38, 44 or teeth are angled toward frame 12, or away from the direction of rotational movement, for at least purposes of minimizing "tangling" with encountered residual plant matter. Stated another way by analogy, the orientation of surface features 44 or teeth in operation with the agricultural device would be similar to reversing the direction of rotation of a saw blade, such as for a circular saw or table saw, resulting in an absence of the blades "biting" into the material being cut. As further shown FIG. 2, disks 34, 40 have an overlap 46 oriented substantially transverse to travel direction 48, to ensure that a strip 26 of exposed soil (FIG. 1) results during forward movement of the agricultural device. During operation of the agricultural device, the effect of rotational movements 50, 52 by respective disks 34, 40 provide a lateral or transverse "scratching effect" of respective peripheral surface features 38, 44 with respect to travel direction 48 of the agricultural device, in order to form the exposed soil strip 26. The relative vertical position of separator 32 with respect to crimping device 35 is controllable by manipulation of adjustment member 74 as previously discussed. Once the relative vertical position between separator 32 and adjustment member is set, the force of hydraulic rams 82 can be varied to achieve the desired result and/or to adapt to varying field conditions.

It is to be understood that the separator may include one pair of disks, or several pairs of disks having peripheral surface features that are substantially aligned with respect to the direction of travel of the agricultural device. However, in an alternate embodiment, the peripheral surface features of the disks may be misaligned with respect to each other. In yet another embodiment, the disks can be sized differently. In a further embodiment, the disks can have different peripheral surface features, such as a smooth edge, although in yet another embodiment, at least one edge may be nonplanar, such as a "zigzag" profile such as used with corrugated cardboard, or other profile. In yet a further embodiment, the disks can have different peripheral surface features, i.e., smooth edge versus teeth, with respect to each other. In a further embodiment, the disks can incorporate any combination of the above identified peripheral surface feature variations.

As further shown FIGS. 2-5, operation of separator 32 is associated with crimping device 35. That is, separator 32 initially forms exposed soil strip 26 in residual plant matter, and crimping device 35 maintains the exposed soil strip 26 while crushing residual plant matter located to each side of separator 32. As shown in FIG. 2 with respect to separator 32, crimping device 35 includes a crimping segment 54 positioned behind and at least partially to one side of separator 32, and a crimping segment 58 positioned behind and at least partially to the other side of separator 32. That is, as shown in FIG. 2, there is an overlap between separator 32 and ends of facing adjacent crimping segments 54, 58 in a direction that is transverse to the direction of travel of the agricultural vehicle. In another embodiment, separator 32 and ends of facing adjacent crimping devices 54, 58 may be positioned substantially flush with respect to one another in a direction that is transverse to the direction of travel of the agricultural device. The term behind, as used herein, refers to the position of the crimping device with respect to the separator in the direction of travel of the agricultural device.

In yet another embodiment, crimping device 35 may be forward of separator 32, and although not shown in FIG. 2, but similar with respect to the previously discussed arrangement in which crimping device 35 is behind separator 32, there can also be an overlap between separator 32 and ends of facing adjacent crimping segments 54, 58 in a direction that is transverse to the direction of travel of the agricultural vehicle. In another embodiment in which crimping device 35 is forward of separator 32, separator 32 and ends of facing adjacent crimping devices 54, 58 may be substantially flush with respect to one another in a direction that is transverse to the direction of travel of the agricultural device. The term forward, as used herein, refers to the position of the crimping device with respect to the separator in the direction of travel of the agricultural device.

In another embodiment, it may be possible for crimping segments 54, 58 to crush residual plant matter without the presence of surface features formed in a crimping segments, i.e., crimping segments 54, 58 being substantially cylindrically shaped and with substantially smooth surfaces, although as further shown in FIG. 2, crimping segment 54 include numerous protrusions 56 outwardly extending from the peripheral surface of crimping segment 54, and crimping segment 58 includes numerous protrusions 60 outwardly extending from the peripheral surface of crimping segment 58. By virtue of protrusions 56, 60 formed on the peripheral surfaces of respective crimping segments 54, 58, such as by welding or using mechanical fasteners to secure strips of material along the surfaces of the crimping segments, the amount of force required to crush residual plant matter is reduced, due to the reduction of surface area of the contact surfaces of the crimping segments and residual plant matter. In another embodiment, protrusions 56, 60 may be integrally formed from a single piece of material for respective crimping devices 54, 58, such as by machining, the crimping segments having a unitary construction. Further, by forming helical protrusions 56, 60 in the respective crimping devices 54, 58, the amount of force required to crush residual plant matter is yet further reduced over a construction in which protrusions 56, 60 are straight and maintained perpendicular to the direction of travel of the agricultural device, i.e., such as a splined configuration. This reduction in force is due to the reduction of surface area along a line tangent with protrusions 56, 60 and transverse to the direction of travel of the agricultural device. The force applied to crush the residual plant matter is controlled by hydraulic rams 82 selectably rotating the interconnected member 64, 70, 78 downwardly, which ultimately controls the proportion of the weight of the agricultural device that is applied to crimping device 35.

In one embodiment, the protrusions 56, 60 of respective crimping segments 54, 58, as well as the other crimping segments that comprise crimping device 35 may utilize opposed helical arrangements, even on the same crimping segment, such as resembling a chevron arrangement. In another embodiment, the profile of the protrusions may differ from a helical pattern, and in a further embodiment, the profiles of the protrusions may differ from each other. In another embodiment the distance the protrusions extend from a surface of crimping segments can vary, and in a further embodiment, the distance can vary for the same crimping segment.

It is to be appreciated that the agricultural device of the present disclosure (primarily adjacent separators 32 and crimping devices 35) can be configured to accommodate different crop row widths, including small grain crops such as soybeans. That is, the separators and crimping devices can be reduced in size and/or staggered relative to one another in the direction of travel of the device such that 15 inch row widths, or potentially, row widths less than one half of 15 inch row widths could be achieved.

FIGS. 7-10 show incremental engagement of the agricultural device with standing residual plant matter 28 in a travel direction 98, with the residual plant matter 28 becoming crushed residual plant matter 30 after engagement with the agricultural device. As further shown in FIGS. 9-10, crushed residual plant matter 30 include multiple (in this instance, six) exposed soil strips 26, providing at least the benefits as discussed above.

Figure 11:
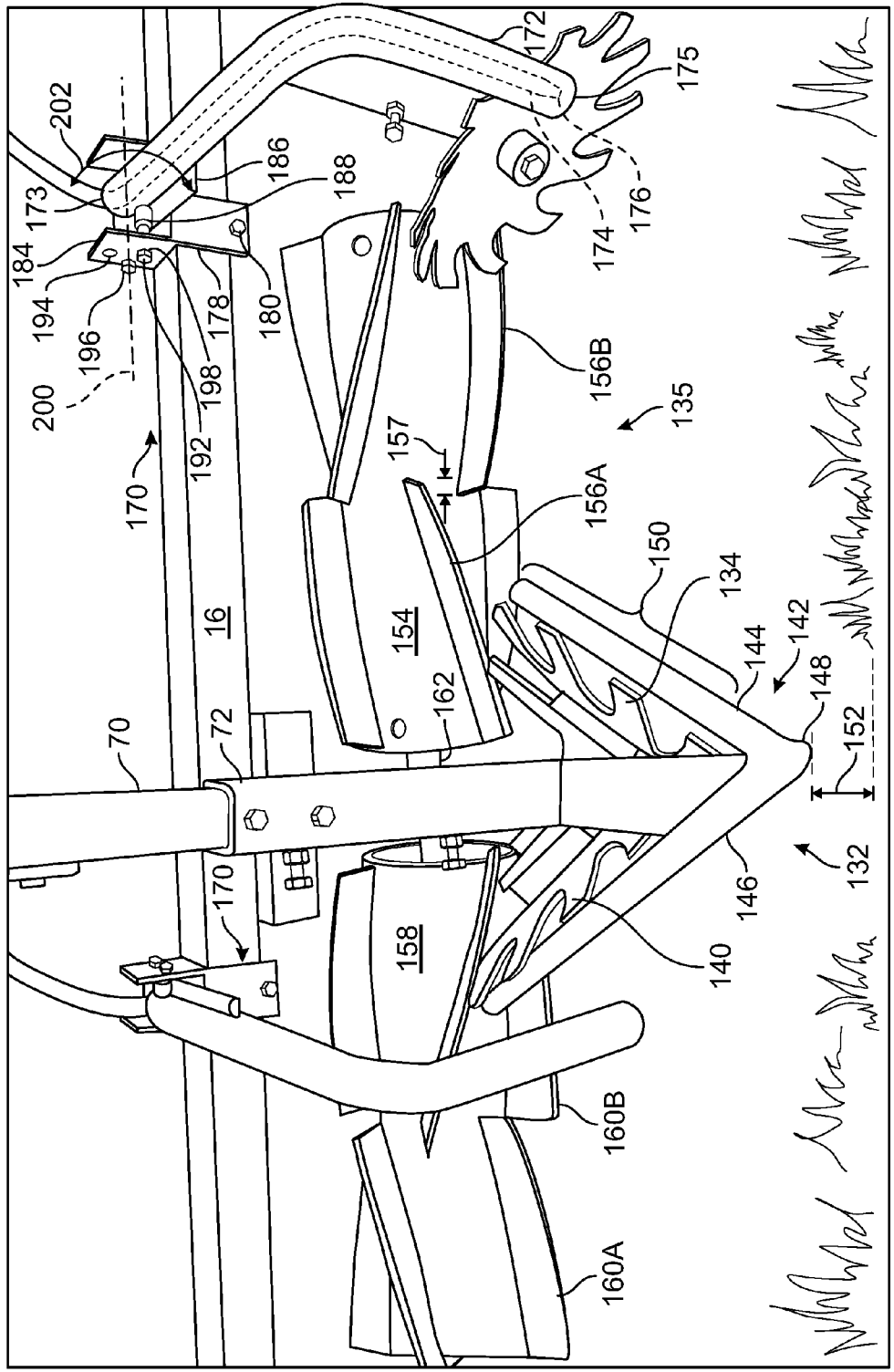
FIG. 11 shows an upper perspective view of an agricultural device according to an alternate embodiment of the present disclosure.

FIG. 11 shows an upper perspective view of an alternate embodiment of the agricultural apparatus or device, including a separator 132 a crimping device 135 and a positioner for an applicator 172. Separator 132 includes a pair of disks 134, 140 such as previously discussed. Separator 132 includes a shield or deflector 142 extending at least partially laterally surrounding separator 132. Deflector 142 includes deflector members 144, 146 joined at a forward juncture 148 at one end of deflector members 144, 146 and extending substantially laterally and outwardly from forward juncture 148 to respective cantilevered portions 150 at opposed ends of the deflector members 144, 146. As further shown in FIG. 11, forward juncture 148 is formed into a point. In one embodiment, forward juncture 148 may form a corner or region of reduced width. Near forward juncture 148, deflector members 144, 146 are secured to structure supporting separator 132. However, as deflector members 144, 146 extend away from forward juncture 148, the deflector members are unsupported, i.e., cantilevered, with respect to the region near forward juncture 148, in order to avoid contact with disks 134, 140 which typically rotate during operation of the agricultural device. In one embodiment, a supporting member (not shown) may be secured to at least one of deflector members 144, 146 along cantilevered portion 150 and another structural member, such as adjustable sleeve 72 or the other deflector member.

As further shown in FIG. 11, forward juncture 148 of deflector members 144, 146 are positioned at a vertical spacing 152 above the ground surface. In one embodiment, deflector members 144, 146 are positioned substantially parallel to the ground surface (assuming the ground surface is substantially flat). However, in another embodiment, at least one of deflector members 144, 146 may be positioned in a non-horizontal arrangement. In one embodiment, vertical spacing 152 may result in deflector members 144, 146 being located at or near the axis of rotation of at least one of disks 134, 140 (similar to axis 42 as shown in FIG. 2). In other embodiments, vertical spacing 152 may be positioned vertically above or vertically below the axis of rotation of either of disks 134, 140. As further shown in FIG. 11, cantilevered portions 150 of deflector members 144, 146 extend to substantially laterally surrounded disks 134, 140, and are spaced apart from respective disks 134, 140 so as to minimize, if not eliminate plant matter from being trapped between respective disks and deflector members. It is to be understood that the spacing between respective disks and deflector members may vary, depending upon the plant matter, different operating conditions, including, but not limited to, the type and size of plant matter encountered, moisture content, travel speed of the agricultural device, field terrain and the like.

Although deflector members 144, 146 are shown as substantially straight, in other embodiments the deflector members 144, 146 may have a nonlinear profile. In another embodiment, the lengths of respective deflector members may be different from each other, and in a further embodiment, the length of at least one deflector member may not extend to laterally surrounded disks. In yet another embodiment, the end of at least one deflector member opposite forward juncture 148 terminates at or near the axis of rotation of the disks. In a further embodiment, the end of at least one deflector member positioned opposite forward juncture 148 terminates forward of the axis of rotation of the respective disk(s). As further shown FIG. 11, deflector members 144, 146 are comprised of bar stock, providing a sufficiently blunt contact surface with plant matter such that the plant matter is deflected and not severed along the region of contact between the plant matter and the deflector members. In other embodiments, deflector members 144, 146 may be defined by cross-sectional profiles perpendicular to the axial length of the deflector members other than a circular profile, including planar or non-planar plates, L-brackets or other shapes lacking a sufficiently sharpened edge that would normally sever plant matter during operation of the agricultural device. In another embodiment, the profile of deflector members 144, 146 may be different from each other.

As further shown in FIG. 11, a portion crimping device 135 includes crimping segment 154 that is adjacent to crimping segment 158 and associated with separator 132 in a manner similar to that previously discussed. Crimping segment 154 includes a plurality of protrusions 156A, 156B outwardly extending from the peripheral surface of crimping segment 154 along opposite sides of separator 132. By virtue of protrusions 156A, 156B and 160A, 160B formed on the peripheral surfaces of respective crimping segments 154, 158, such as by welding or using mechanical fasteners to secure strips of material along the surfaces of the crimping segments, the amount of force required to crush residual plant matter is reduced, due to the reduction of surface area of the contact surfaces of the crimping segments and residual plant matter. As further shown in FIG. 11, protrusions 156A, 156B and 160A, 160B include a plurality of stepped or offset slanted protrusions in which protrusions 156A, 160A are basically or substantially mirror images of respective protrusions 156B, 160B using a plane that is perpendicular to an axis of rotation 162. In one embodiment, in which the axis of rotation for each crimping segment 154, 158, is different from each other, e.g., the axis of rotation of crimping segment 154 and the axis of crimping segment 158 forming a "V" shape, the protrusions of the respective crimping segments are substantially mirror images about a plane centrally positioned between crimping segments 154, 158 and coincident with travel direction 48 (FIG. 2). Stated another way, protrusions 156A, 156B may resemble a rear tractor tire tread, and may include an overlap 157 of facing ends of the protrusions that are positioned at or near a middle region of respective crimping segments 154, 158. By virtue of protrusions 156A, 156B and 160A, 160B having an opposed slanted arrangement, and more specifically having the opposed slanted arrangement associated with each side of separator 132, plant matter that is contacted and at least partially crushed by protrusions 156A, 156B, and 160A, 160B. In an alternate embodiment, respective protrusions 156A, 156B and 160A, 160B may resemble a discontinuous chevron. That is, opposed protrusions 156A, 156B and 160A, 160B would not intersect in the middle of respective crimping segments 154, 158, i.e., would not form an intersection point.

FIG. 11 further shows positioner 170 for an applicator 172 for selectable control of a liquid, such as fertilizer, or water from a source (not shown) associated with the agricultural device. Applicator 172 includes a tube having a first end 173 and a second end 175 opposite of the first end. A line 174 in fluid communication with a liquid source is directed through first end 173 and extends toward second end 175, line 174 terminating at a nozzle 176 which permits focused application of the liquid from the liquid source. The position of applicator 172 in a direction transverse to the direction of travel of the agricultural device may be controlled by positioner 170. That is, positioner 170 includes a pair of opposed flanges 178 that are configured to slide over secondary frame 16 of the agricultural device. Flanges 178 permit selectable transverse movement of positioner 170 along secondary frame 16. A fastener 180, such as a bolt or other suitable device urges opposed flanges 178 toward each other to secure applicator 172 in a fixed position with respect to secondary frame 16.

As further shown in FIG. 11, positioner 170 includes the capability of rotatably positioning applicator 172 between an extended position as shown in FIG. 11 and a retracted position (not shown). Positioner 170 includes a pair of opposed flanges 184 having a plurality of apertures 192, 194, 196 formed therethrough. A fastener 196 pivotably engages a base 186 secured at or near end 173 of applicator 172. When fastener 196 is the only fastener extending through base 186, applicator 172 can rotate about an axis of rotation 200 having rotational movement 202 between the extended position as shown, and a retracted position, in which base 186 of applicator 172 at or near end 173 is rotated toward a substantially vertical position. In the extended position, a sleeve 188 is in axial alignment with aperture 192 such that a fastener 198 may be inserted through aperture 192 and inside of sleeve 188. When fastener 198 is secured through aperture 192 and inside of sleeve 188, applicator 172 is prevented from rotating about axis of rotation 200 and is maintained in the extended position as shown in FIG. 11. However, upon removal of fastener 198, applicator 172 may be rotated about axis of rotation 200 until sleeve 188 is in axial alignment with aperture 194. When fastener 198 is secured through aperture 194 and inside of sleeve 188, applicator 172 is prevented from rotating about axis of rotation 200 and is maintained in the retracted position.

While the disclosure has been described with reference to a preferred embodiment, it will be understood by those skilled in the art that various changes may be made and equivalents may be substituted for elements thereof without departing from the scope of the disclosure. For example, telescoping or linear devices may be hydraulically driven, and/or these devices may be driven with hydraulics, air, water, or electricity or any combination thereof.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An agricultural device associated with reduced tillage techniques in a field, comprising:
   a frame;
   a separator supported by the frame, the separator forming a first furrow in the form of a first strip of exposed soil in residual plant matter in the field, the first strip being formed along a direction of travel of the agricultural device and adjacent and parallel to a second furrow in the form of a second strip, the separator being positioned in a center area of the first strip perpendicularly to the direction of travel; and
   a crimping device associated with the separator, the crimping device configured to at least partially crush stems of residual plant matter located in the first strip, the second strip, and in a region between the first strip and the second strip and while maintaining the first strip and the second strip, the crimping device being positioned perpendicular to the direction of travel and extending across to cover (a) at least in part the first strip, (b) at least in part the second strip, and (c) the region between the first strip and the second strip.

2. The device of claim 1, wherein the frame is operatively connected to an implement or vehicle.

3. The device of claim 1, wherein the crimping device is used in combination with another implement.

4. The device of claim 1, wherein the crimping device is used without other implements.

5. The device of claim 1, wherein the separator is positioned to encounter residual plant matter prior to the crimping device encountering residual plant matter.

6. The device of claim 1, wherein the crimping device is positioned to encounter residual plant matter prior to the separator encountering residual plant matter.

7. The device of claim 2, wherein the implement is selected from a group of implements consisting essentially of tilling machines, planters, and fertilizing devices.

8. The device of claim 1, wherein a force applied by the crimping device to the residual plant matter is a variable.

9. The device of claim 1, wherein the separator includes a pair of disks positioned to contact and to be urged into rotational movement by residual plant matter.

10. The device of claim 9, wherein the pair of disks have an overlap substantially transverse to a travel direction of the device.

11. The device of claim 10, wherein at least one disk of the pair of disks is oriented by at least one of a deviation angle relative to a base structure of the separator and a travel direction of the device, and a tilt angle relative to an edge of the base structure of the separator and a vertical axis.

12. The device of claim 11, wherein the deviation angle is between about 10 degrees and about 35 degrees.

13. The device of claim 11, wherein the tilt angle is between zero and about 35 degrees.

14. The device of claim 10, wherein the separator includes a deflector extending at least partially laterally surrounding the separator.

15. The device of claim 1, wherein the crimping device has a surface having outwardly extending protrusions therefrom.

16. The device of claim 15, wherein the protrusions form a helical arrangement.

17. The device of claim 15, wherein the protrusions form a chevron arrangement or a discontinuous chevron arrangement.

18. The device of claim 15, wherein crimping devices include opposed crimping segments positioned along opposite sides of the separator, wherein arrangement of the protrusions of the crimping segments are substantially mirror images of each other.

19. An agricultural planter usable with reduced tillage techniques in a field, comprising:
   an apparatus having a frame for positioning seed in the field;
   a first separator supported by the frame, the first separator forming a furrow in the form of a first strip of exposed soil in residual plant matter in the field, the first separator being positioned in a center area of the first strip;
   a second separator supported by the frame, the second separator forming a furrow in the form of a second strip of exposed soil in the residual plant matter in the field, the second strip being adjacent and parallel to the first strip, the second separator being positioned in a center area of the second strip; and
   a crimping device coupled between the first separator and the second separator, the crimping device being configured to at least partially crush stems of the residual plant matter located in the first strip, the second strip, and in a region between the first strip and the second strip and while maintaining the first strip and the second strip for receiving seed from the apparatus, the crimping device being positioned perpendicular to the direction of travel and extending across to cover (a) at least in part the first strip, (b) at least in part the second strip, and (c) the region between the first strip and the second strip.

20. A method for achieving reduced tillage techniques in a field, comprising:
   forming two furrows in the form of parallel and adjacent strips of exposed soil in residual plant matter in the field; and
   at least partially crushing stems of residual plant matter, via a crimping device, located at least in part in the strips and in a region between the strips while maintaining the strips, wherein forming the strips and crushing stems are achieved in a single pass along the field.

* * * * *